US007229654B2

(12) United States Patent
Gaonkar et al.

(10) Patent No.: US 7,229,654 B2
(45) Date of Patent: Jun. 12, 2007

(54) MULTILAYER EDIBLE MOISTURE BARRIER FOR FOOD PRODUCTS AND METHOD OF USE

(75) Inventors: Anilkumar Ganapati Gaonkar, Buffalo Grove, IL (US); Laura Herbst, Buffalo Grove, IL (US); Weizhi Chen, Northfield, IL (US); Dennis A. Kim, Buffalo Grove, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 10/826,709

(22) Filed: Apr. 16, 2004

(65) Prior Publication Data

US 2004/0197459 A1    Oct. 7, 2004

Related U.S. Application Data

(63) Continuation-in-part of application No. 10/304,446, filed on Nov. 26, 2002.

(51) Int. Cl.
   A23D 9/00        (2006.01)
   A23D 9/007       (2006.01)
   A23D 9/013       (2006.01)

(52) U.S. Cl. ..................... 426/89; 426/99; 426/302

(58) Field of Classification Search ............... 426/89, 426/273, 289, 291, 293, 302, 310, 654, 417, 426/442, 99
See application file for complete search history.

(56) References Cited

U.S. PATENT DOCUMENTS

| | | | |
|---|---|---|---|
| 2,521,219 A | 9/1950 | Holman et al. | |
| 3,293,043 A | 12/1966 | Mace et al. | |
| 3,526,515 A | 9/1970 | Werbin et al. | |
| 3,696,514 A | 10/1972 | McIntyre et al. | |
| 3,965,323 A | 6/1976 | Forker, Jr. et al. | |
| 3,997,674 A * | 12/1976 | Ukai et al. ............... | 426/90 |
| 4,157,403 A | 6/1979 | Schiffmann et al. | |
| 4,293,572 A | 10/1981 | Silva et al. | |
| 4,401,681 A | 8/1983 | Dahle | |
| 4,448,791 A | 5/1984 | Fulde et al. | |
| 4,472,440 A | 9/1984 | Bank | |
| 4,504,502 A | 3/1985 | Earle et al. | |
| 4,603,031 A | 7/1986 | Gelbman | |
| 4,661,359 A | 4/1987 | Seaborne et al. | |
| 4,671,963 A | 6/1987 | Germino et al. | |
| 4,710,228 A | 12/1987 | Seaborne et al. | |
| 4,721,622 A | 1/1988 | Kingham et al. | |
| 4,810,534 A | 3/1989 | Seaborne et al. | |
| 4,847,098 A | 7/1989 | Langler | |
| 4,880,646 A | 11/1989 | Lew et al. | |
| 4,915,971 A | 4/1990 | Fennema et al. | |
| 4,960,600 A | 10/1990 | Kester et al. | |
| 4,999,208 A | 3/1991 | Lengerich et al. | |
| 5,035,904 A | 7/1991 | Huang et al. | |
| 5,089,278 A | 2/1992 | Haynes et al. | |
| 5,130,150 A | 7/1992 | Averbach | |
| 5,130,151 A | 7/1992 | Averbach | |
| 5,147,670 A * | 9/1992 | Cebula et al. ............... | 426/98 |
| 5,248,512 A | 9/1993 | Berberat et al. | |
| 5,376,388 A | 12/1994 | Meyers | |
| 5,401,518 A | 3/1995 | Adams et al. | |
| 5,409,715 A | 4/1995 | Meyers | |
| 5,409,717 A | 4/1995 | Apicella et al. | |
| 5,433,960 A | 7/1995 | Meyers | |
| 5,472,724 A | 12/1995 | Williams et al. | |
| 5,518,744 A | 5/1996 | Kaeser et al. | |
| 5,520,942 A * | 5/1996 | Sauer et al. ............... | 426/289 |
| 5,543,164 A | 8/1996 | Krochta et al. | |
| 5,573,793 A | 11/1996 | Saintain | |
| 5,705,207 A | 1/1998 | Cook et al. | |
| 5,736,178 A | 4/1998 | Cook et al. | |
| 5,753,286 A | 5/1998 | Higgins | |
| 5,756,140 A | 5/1998 | Shoop et al. | |
| 5,789,008 A | 8/1998 | Monte | |
| 5,795,603 A | 8/1998 | Burger | |
| 5,885,617 A | 3/1999 | Jordan | |
| 5,891,495 A | 4/1999 | Cain et al. | |
| 5,928,692 A | 7/1999 | Mayfield | |
| 5,939,114 A | 8/1999 | Cain et al. | |
| 6,038,542 A | 3/2000 | Ruckdashel | |
| 6,039,988 A | 3/2000 | Monte | |
| 6,066,347 A | 5/2000 | Prasad et al. | |
| 6,110,515 A | 8/2000 | Clechet et al. | |
| 6,139,885 A | 10/2000 | Jouanneau et al. | |
| 6,146,672 A | 11/2000 | Gonzalez et al. | |
| 6,177,112 B1 | 1/2001 | Dufort et al. | |
| 6,461,654 B1 | 10/2002 | Cain et al. | |
| 6,472,006 B1 * | 10/2002 | Loh et al. ............... | 426/99 |
| 6,500,474 B2 | 12/2002 | Cross et al. | |
| 6,503,546 B1 | 1/2003 | Ferrari-Philippe et al. | |
| 2003/0008037 A1 | 1/2003 | Valenzky, Jr. et al. | |
| 2003/0008038 A1 | 1/2003 | Valenzky, Jr. et al. | |
| 2003/0077356 A1 | 4/2003 | Campbell et al. | |

FOREIGN PATENT DOCUMENTS

EP    0421510    4/1991

(Continued)

OTHER PUBLICATIONS

Lange's Handbook of Chemistry (15th Edition). McGraw Hill (1999). Knovel Database (published online Mar. 2, 2001) [retrieved from internet Aug. 17, 2004] Table 3.2 URL <http://www.knovel.com/knovel2/Toc.jsp?SpaceID=145&BookID=47>.*

(Continued)

Primary Examiner—Arthur L. Corbin
(74) Attorney, Agent, or Firm—Fitch, Even, Tabin & Flannery

(57) ABSTRACT

An edible multilayer moisture barrier for food products is provided for separating food components having different water activities and preventing or significantly inhibiting movement of water between the food components. The edible multilayer moisture barrier of the present invention includes a lipid layer and a flexible hydrophobic layer.

67 Claims, No Drawings

FOREIGN PATENT DOCUMENTS

| | | |
|---|---|---|
| EP | 0509566 | 10/1992 |
| EP | 1080642 | 3/2001 |
| EP | 1080643 | 3/2001 |
| EP | 1142494 | 10/2001 |
| EP | 1247460 | 10/2002 |
| JP | A 60224445 | 11/1985 |
| JP | 63146730 | 6/1988 |
| WO | WO 92/01394 | 2/1992 |
| WO | WO 97/15198 | 5/1997 |
| WO | WO 99/51102 | 10/1999 |
| WO | WO 01/97625 | 12/2001 |
| WO | WO 03/007736 | 1/2003 |
| WO | WO 03039852 | 5/2003 |

OTHER PUBLICATIONS

The Edible Oils Co. First published online Jul. 1, 2003 [retrieved from Internet Sep. 14, 2004] URL <http://edibleoils.net/hydrogenated_soybean_oil_spec.htm>.*

Donhowe et al., "Water Vapor and Oxygen Permeability of Wax Films" *JAOCS*, vol. 70, No. 9, Sep. 1993.

Hagenmaier et al., "Edible Coatings from Morpholine-Free Wax Microemulsions", *J. Agric. Food Chem.* 45, 349-352, 1997.

Greener et al., "Barrier Properties and Surface Characteristics of Edible, Bilayer Films", *Journal of Food Science*. vol. 54, No. 6, 1989.

Kester et al., "The Influence of Polymorphic Form an Oxygen and Water Vapor Transmission through Lipid Films", *JAOCS*, vol. 66, No. 8, Aug. 1989.

Kester et al., "Resistance of Lipid Films to Water Vapor Transmission", *JAOCS*, vol. 66, No. 8, Aug. 1989.

Landmann et al., "Permeability of Some Fat Products to Moisture", *The Journal of the American Oil Chemists' Society*, vol. 37, Jan. 1960.

Lovegren et al., "Permeability of Acetostearin Products to Water Vapor", *Agriculture and Food Chemistry*, vol. 2., No. 11, May 26, 1954.

Martin-Polo et al., "Hydrophobic Films and Their Efficiency Against Moisture Transfer. 2. Influence of the Physical State", *J. Agric. Food Chem.*, vol. 40, No. 3, 1992.

Kamper et al., Water Vapor Permeability of Edible Bilayer Films, *Journal of Food Science*, vol. 49, 1984.

Greener et al., Evaulation of Edible, Bilayer FIlms for Use as Moisture Barriers for Food, *Journal of Food Science*, vol. 54, No. 6, 1989.

Kamper et al., Use of Edible Film to Maintain Water Vapor Gradients in Foods, *Journal of Food Science*, vol. 50, 1985.

Kester et al., "An Edible Film of Lipids and Cellulose Ethers: Barrier Properties to Moisture Vapor Transmission and Structural Evaluation", *Journal of Food Science*, 54, No. 6, 1989.

Kamper et al Water Vapor Permeability of an Edible, Fatty Acid, Bilayer Film, *Journal of Food Science*, vol. 49, 1984.

Greener et al., "Barrier Properties and Surface Characteristics of Edible, Bilayer Films", *Journal of Food Science*, vol. 54, No. 6, 1989.

Motillon et al., "Factors Affecting the Moisture Permeability of Lipid-Based Edible Films: A Review", *Critical Reviews in Food Science and Nutrition*, 42(1):67-89, 2002.

Rhodes et al., "Coatings for Controlled-Release Drug Delivery Systems", *Drug Development and Industrial Pharmacy*, 24(12), 1139-1154, 1998.

Shukla, "What's a Plastics Extruder Doing in the Food Business", *Cereal Foods World*, vol. 41, No. 8, Aug. 1996.

Chen, "Functional Properties and Applications of edible Films Made of Milk Proteins", *J Dior Sci*, 78:2563-2583, 1995.

Kester et al., "An Edible Film of Lipids and Cellulose Ethers: Performance in a Model Frozen-Food System", *Journal of Food Science*, vol. 54, No. 6, 1989.

Koelsch et al., "Functional, Physical, and Morphological Properties of Methyl Cellulose and Fatty Acid-Based Edible Barriers", *Lebensm.-Wisss.u.Technol*, vol. 25, 1992.

EP Search Report, EP 04250728, 2004, 4 pages.

Robinson, "Building a Better Cheese", *Food R & D*, Dairy Field's Ingredient Technology Section, vol. 181(4), pp. 39-41, 1998.

Hui, "Edible Oil and Fat Products: Products and Application Technology", *Wiley-Interscience*, 233750, p. 340. 1999.

* cited by examiner

MULTILAYER EDIBLE MOISTURE BARRIER FOR FOOD PRODUCTS AND METHOD OF USE

RELATED APPLICATIONS

The present application is a continuation-in-part of U.S. patent application Ser. No. 10/304,446, filed Nov. 26, 2002, which is incorporated herein by reference.

FIELD OF INVENTION

The present invention relates to an edible multilayer moisture barrier suitable for use in food products. More particularly, the edible multilayer moisture barrier is useful in preventing and/or inhibiting moisture migration within a multi-component food product and is flexible. The edible multilayer moisture barrier of this invention includes a lipid layer and a flexible hydrophobic layer.

BACKGROUND

For many food products, moisture levels must be maintained if the product is to exhibit optimum organoleptic properties, quality, and taste. Moisture migration in finished food products can seriously compromise quality, stability, and organoleptic properties. In addition, many undesirable chemical and enzymatic reactions proceed at rates partially governed by the moisture content of foods. Excessive rates of these reactions can promote deleterious changes in the flavor, color, texture, and nutritive value of food products.

In multi-component food products, particularly those having components with different moisture contents and water activities (e.g., prepackaged cheese and crackers, prepackaged bagel and cream cheese products, and the like), moisture can migrate between adjacent components, altering the component's characteristics and organoleptic properties. In addition to compromising the quality of finished food products, moisture migration can hinder production and distribution of food products. Thus, for example, the cheese in a cheese/cracker product could dry out while, at the same time, the cracker losses its crispness.

One method to prevent moisture migration in foods involves coating one or more surfaces of the food product with an edible moisture barrier. Such barriers should have a low moisture permeability in order to prevent the migration of water between areas of differing water activities. In addition, the barrier should cover the food surface completely, including crevices, and adhere well to the food product surface. The moisture barrier should be sufficiently strong, soft, and flexible to form a continuous surface that will not crack upon handling, yet can be easily penetrated during consumption. In addition, the barrier film's organoleptic properties of taste, aftertaste, and mouthfeel should be imperceptible so that the consumer is not aware of the barrier when the food product is consumed. Finally, the moisture barrier should be easy to manufacture and easy to use.

Because lipids, such as oils, fats, and waxes, are composed of lipophilic water-insoluble molecules capable of forming a water-impervious structure, they have been investigated for use in moisture barrier films. With respect to oleaginous materials derived from lipids (i.e., sucrose polyesters, acetylated monoglycerides and the like) and/or other film forming lipids, it has been shown that, unless an undesirably thick coating is used, the barrier is not sufficiently effective for food products requiring long shelf life. Such film forming lipids tend to become unstable under normal, practical use condition and loss film integrity and barrier effectiveness. In addition to structural instability, such as oiling off or cracking upon handling or with changes in temperatures, such lipid-based moisture barriers have disadvantages of being organoleptically unacceptable since they usually have a greasy or waxy mouthfeel.

Accordingly, many of the barriers in the art use a water-impermeable lipid in association with hydrocolloids or polysaccharides (e.g., alginate, pectin, carrageenan, cellulose derivatives, starch, starch hydrolysates, and/or gelatin) to form gel structures or crosslinked semi-rigid matrixes to entrap and/or immobilize the nonaqueous or lipid material. In many cases these components are formed as bilayer films. These bilayer films may be precast and applied to a food surface as a self-supporting film with the lipid layer oriented toward the component with highest water activity. See, e.g., U.S. Pat. No. 4,671,963 (Jun. 9, 1987), U.S. Pat. No. 4,880,646 (Nov. 14, 1987), U.S. Pat. No. 4,915,971 (Apr. 10, 1990), and U.S. Pat. No. 5,130,151 (Jul. 14, 1992).

There are, however, a number of drawbacks associated with these prior art moisture barriers. The hydrocolloids themselves are hydrophilic and/or water soluble and thus tend to absorb water with time. The absorption of water by the hydrophilic material in such moisture barriers is greatly accelerated while the film is directly in contact with foods having a water activity ($A_w$) above 0.75. In addition, some hydrocolloids tend to make the barriers fairly stiff, requiring the addition of a hydrophilic plasticizer (e.g., polyol) to increase flexibility. These plasticizers are often strong moisture binders themselves thus promoting moisture migration into the barriers and decreasing structural stability and effectiveness of the barriers. Furthermore, the texture and the required thickness of some of these barriers often make their presence perceptible and objectionable when the product is consumed. Additional processing steps (e.g., casting and drying) are required to form these films, thus making them difficult to use in high speed commercial production.

The edible moisture barriers provided by the present invention represents a significant improvement of prior art moisture barriers and overcomes the problems associated with the prior art moisture barriers.

SUMMARY

The present invention provides an edible multilayer moisture barrier for food products. This edible multilayer moisture barrier is highly effective in preventing moisture migration within a multi-component food product between food components having different water activities and/or moisture contents at a given storage temperature. The edible multilayer moisture barrier is effective for providing a barrier with sufficient mechanical flexibility to be organoleptically acceptable with various food types at a range of storage and use temperatures. The edible multilayer moisture barrier can be easily applied with commercial equipment. The edible multilayer moisture barrier is flexible and, thus, does not easily crack with handling or use.

The edible multilayer moisture barrier of the present invention includes a lipid layer and a flexible hydrophobic layer. Preferably the lipid layer is also flexible. The lipid layer is formed from a composition comprising 0 to about 35 percent of an edible microparticulated high melting lipid having a melting point of about 70° C. or higher and an edible low melting triglyceride blend having a melting point of about 35° C. or lower. For purposes of this invention, an "edible low melting triglyceride blend" includes a single edible low melting triglyceride and, preferably, mixtures of such triglycerides. Such mixtures of triglycerides generally include natural, fully or partially hydrogenated edible fats and oils, fractionated edible fats and oils, and/or non-hydrogenated edible fats and oil having the appropriate solid fat content (SFC) profile (as detailed below). Suitable edible low melting triglycerides include oxidatively stable natural, hydrogenated, and/or fractionated vegetable oils or animal fats including, for example, coconut oil, rapeseed oil, soybean oil, palm oil, palm kernel oil, sunflower oil, corn oil, canola oil, cottonseed oil, peanut oil, cocoa butter, anhydrous milkfat, lard, beef fat, and the like, as well as mixtures thereof. Preferred edible low melting triglycerides should be stable against oxidation and/or hydrolysis and include canola oil, palm oil, palm kernel oil, coconut oil, partially hydrogenated soybean oil, and mixtures thereof. In addition, the lipid layer may also contain up to about 35 percent of an edible microparticulated high melting lipid having a melting point of about 70 EC or higher. If included in the lipid layer, the edible microparticulated high melting lipid should not contain sufficient amounts of large particles (generally about 50 microns or greater) to impart a gritty texture of the food product in which the moisture barrier is used. Preferably, the edible microparticulated high melting lipid has a volume average particle size (as measured, for example, using a Horiba LA-900 Laser Particle Sizer from Horiba Instrument, Inc., Irvine, Calif.) of about 10 microns or less (preferably about 1 to abut 5 microns), wherein at least about 5 percent of the microparticulated lipid particles have a particle size of 1 microns or less. This composition has unique thermomechanical properties that makes it ideal as an edible moisture barrier for use in food products.

In an important aspect, the lipid layer provides a barrier where solid fat content (SFC) does not change more than about 5 percent if the storage temperature changes about +/−5° C. Changes of greater than about 5 percent, could compromise the effectiveness of the barrier. In the most important aspect of the invention, SFC of the lipid layer at the storage temperature of the product is about 50 to about 70 percent, preferably about 55 to about 70 percent, and most preferably about 60 to about 65 percent at the storage temperature of the product (i.e., about 0 to about 5° C. for refrigerated storage conditions and about 15 to about 25° C. for ambient storage conditions). In order to achieve the desired organoleptic properties, the SFC of the lipid layer should change of at least 20 percent at temperatures in the range of about 20 to 37° C. and less than about 35 percent at temperature in the range of 37 to about 60° C. These characteristics provide a moisture barrier with a rapid and clean melt and a non-waxy mouthfeel.

Typically, the lipid layer includes about 65 to 100 percent of the edible low melting triglyceride blend and 0 to about 35 percent of the edible microparticulated high melting lipid. Preferably, the lipid layer contains about 75 to about 95 percent of the edible low melting triglyceride blend and about 5 to about 25 percent of the edible high melting lipid; most preferably the composition contains about 85 to about 92 percent of the edible low melting triglyceride blend and about 8 to about 15 percent of the edible high melting lipid. The lipid layer has a thickness of about 50 microns to about 1 mm, and more preferably about 125 to about 300 microns.

As noted above, the lipid layer may optionally contain a dispersion of solid particles (i.e., microparticulated high melting lipid). In such cases, the lipid film preferably contains about 0.1 to about 30 percent solid particles, based on the weight of the lipid film. Examples of solid particles that can be dispersed in the lipid layer include chocolate, peanut butter, confectionery cream, and the like as well as mixtures thereof. As also noted, above, the particle size distribution should provide a non-gritty perception when the food product is consumed. Particles can be of any shape and they are dispersed within the lipid layer composition using conventional mixing techniques and equipment.

The multilayer edible moisture barrier further includes a flexible hydrophobic layer. The flexible hydrophobic layer may include waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof. The flexible hydrophobic layer is generally about 50 microns to about 1 mm thick, and preferably about 125 to about 300 microns thick.

The present invention also provides a method for preventing moisture migration between food components having different moisture levels. In this aspect, the edible multilayer moisture barrier is particularly effective for use in multicomponent foods with at least one component having an $A_w$ of greater than about 0.75. The edible multilayer moisture barrier of the invention has a low moisture permeability, good flexibility, and is easy to manufacture and used with a variety of food products. The edible multilayer moisture barrier is specially formulated for intended storage temperature of the food product and is effective for covering a food surface completely and providing a barrier that is sufficiently strong, stable and non-brittle to form a surface that will resist cracking during handling and storage (at refrigeration or ambient temperatures), but is easily penetrated during consumption. The edible multilayer barrier has organoleptic properties of taste, aftertaste, and mouthfeel that are essentially imperceptible such that the consumer is unaware of the presence of the barrier when the product is consumed. The edible multilayer moisture barrier of the invention is effective for reducing moisture migration between food components over 21 days storage by at least 90 percent, more preferably by at least 99 percent, and most preferably by at least 99.9 percent, as compared to food components where no moisture barrier is present. The edible multilayer moisture barrier of the invention is further effective for increasing refrigerated shelf life of a food product containing the moisture barrier by at least 8 times, and more preferably by at least 16 times, as compared to food product where no moisture barrier is present. This generally translates into a refrigerated shelf life for a multicomponent food product of four months or longer.

The present invention also provides a method for reducing moisture migration between food components. In this aspect, the edible multilayer moisture barrier is brought into contact with a food component in an amount effective for reducing moisture migration from one food component to another. Generally, the edible multilayer moisture barrier is applied to the food component to form an essentially continuous barrier layer at least about 100 microns thick, preferably about 200 microns to about 1 mm thick, and more preferably about 250 to about 500 microns thick.

DETAILED DESCRIPTION

The edible multilayer moisture barrier of the present invention has organoleptic properties of taste, aftertaste, and mouthfeel that are imperceptible such that the consumer is unaware of the presence of the barrier when the product is consumed. The multilayer moisture barrier is flexible and self-supported which eliminates the need for a base polymer network/film, thus eliminating the need for casting, coating or drying with a polymeric base layer and resulting undesirable textured defects, such as hardness or chewiness. Indeed, the edible moisture barrier of the present invention is rapid and clean melting, is free from residues, and has a creamy (i.e., smooth), non-waxy mouthfeel.

Additionally, the edible multilayer moisture barrier composition of the present invention includes a lipid layer that posses a stable network structure supported by numerous, fine crystalline fat particles which resist the tendency to recrystallize, bloom or crack and provides good stability at targeted storage temperature of the food product. The specific fat/oil ratio defined by SFC is tailored and maintained for actual storage temperatures. This stable, fine fat crystal network also help to immobilize liquid oil fraction in the barrier. Overall, this provides a stable, water resistant, nonporous lipid layer resulting in a more effective barrier and a more stable fat matrix, such that cracking occurring during cooling and storage may be minimized. Specific SFC is also designed for rapid melting at body temperatures to impart a pleasant or nondetectable mouthfeel and for ease of application by, for example, spraying, brushing or enrobing.

Definitions

Unless defined otherwise, all technical and scientific terms used herein have the same meaning as commonly understood by one of ordinary skill in the art to which this invention belongs. All patents and publications referred to herein are incorporated by reference herein. All percentages or ratios are by weight unless indicated otherwise. For purposes of the present invention, the following terms are defined below; other terms may be defined elsewhere in this specification as well.

As used herein, "barrier" or "moisture barrier" is understood to describe a thin, essentially continuous structure or layer that is essentially impermeable to moisture migration through it, and which coats an inner or outer surface of a food product. The barrier may be described as a coating, film, or membrane. The barrier can be placed between components having differing water activities within the food product to prevent or significantly reduce moisture migration between the components or on the outer surface of the food product to prevent or significantly reduce moisture migration between the food product and the ambient environment. The moisture barrier of this intention is designed to be used in direct contact with moist foods and to be effective against moisture migration through vapor equilibrium and/or liquid diffusion. For purposes of this invention, in the case of preventing moisture migration between the food product and the ambient environment, the first food component would be considered to be one or more outer surfaces of the food product and the second food component would be considered to be the ambient environment.

As used herein, "water activity" ($A_w$) is the ratio of vapor pressure of water in the food of interest and vapor pressure of pure water at the same temperature.

As used herein "lipid" refers to any of a group of substance that in general are soluble in or miscible with ether, chloroform, or other organic solvents for fats and oils (technically, triglycerides of fatty acids, short for triglycerides) but are practically insoluble in water. Lipids may be classified as simple lipids, compound lipids or derived lipids. Simple lipids include esters of fatty acids with alcohols. Fats and oils are esters of fatty acids with glycerol, and waxes are esters of fatty acids with alcohols other than glycerol. Compound lipids include phospholipids, cerebrosides or glycolipids, and others, such as sphigolipids, and carotenoids. Derived lipids include substances derived from natural lipids (simple or compound) and include fatty acids, fatty alcohols and sterols, hydrocarbons and emulsifiers (artificially derived, surface active lipids).

"Fat/oil ratio" or "solid fat content" (SFC) is commonly used to describe the rheology and phase composition of lipids. Fat is solid at a given temperature, whereas oil is liquid. The fat/oil ratio of a given lipid is not a constant but a function of temperature. For example, butter can be regarded as mainly solid (about 70 percent SFC) at 0° C., plastic (about 15 percent SFC) at room temperature, and completely liquid (0 percent SFC) above 40° C. Therefore, it is possible to tailor a blend of triglycerides that has any fat/oil ratio at a given temperature(s) (at least in the temperatures of interest for food products). When a lipid-based fat crystal control agent is used in the composition, such agent itself is also often lipid, hence, the actual SFC of a barrier must include the fat and oil fractions from the fat crystal control agent. Fat/oil ratio in a barrier varies with temperature and is important to barrier effectiveness and stability at actual storage temperature (e.g., about 0 to about 5° C. for refrigerated storage) of food product. It is also an important aspect of this invention that barrier composition alone without considering its exact SFC profile can not provide superior barrier effectiveness. In other words, an effective barrier composition at ambient temperature will likely fail at refrigeration temperature and vice versa if its SFC changes significantly between about 20 and about 5° C. The fat/oil ratio is also important for mouthfeel/sensory acceptability at about 25 to about 37° C., and is important for ease of application at the temperature (typically greater than about 40° C.) for transport or application (for example, spraying).

"Barrier effectiveness" was evaluated analytically by a cheese-cup method. A control was prepared by using a water impermeable plastic cup packed with Kraft Velveeta brand process cheese ($A_w$=0.94) and placed in a constant humidity chamber over saturated magnesium chloride solution with an equilibrium relative humidity of about 33 percent at refrigeration temperature (about 5±1° C. for all examples). Moisture or weight loss is monitored over a 21-day period as a reference point for the comparison of barrier effectiveness. Too short of a storage time often gives unreliable results that can not be extrapolated to longer term (for example 4 months) storage performance. Similarly prepared cheese-cups coated with selected barrier composition with a thickness of about 300 microns were compared to control under identical condition in terms of "percent moisture loss" versus storage time. Average of at least 4 replicates are required and used for comparison purpose. This method simulates more closely the actual product application condition in which the barrier is in direct contact with a moist food component. Generally, less than about 1 percent moisture loss over a 3 week period provides an effective moisture barrier.

Lipid Layer Composition

The lipid layer of the edible multilayer moisture barrier of the invention includes an edible low melting lipid blend having a melting point of about 35° C. or lower and having a SFC at targeted storage temperature of the food product of about 50 to about 70 percent, preferably about 55 to about 70 percent and most preferably about 60 to about 65 percent. For practical purpose, the low melting lipid preferably comprises a blend of triglycerides of fatty acids including natural, (fully or partially) hydrogenated and/or fractionated edible fats and oils and is referred to "edible low melting triglyceride blend" hereof. For purpose of this invention, the phrases "edible low melting triglyceride" is intended to include single triglycerides as well a mixtures or blends of triglycerides. Modified or synthetic lipids such as acetylated monoglyceride and paraffin oil may also be used, but less preferred. Suitable edible low melting triglycerides generally include a blend of one or more hydrogenated or non-hydrogenated oils having the desired SFC profile. Suitable edible low melting triglycerides include oxidatively stable, natural, or hydrogenated and/or fractionated vegetable oils or animal fats including, for example, coconut oil, rapeseed oil, soybean oil, palm oil, palm kernel oil, sunflower oil, corn oil, canola oil, cottonseed oil, peanut oil, cocoa butter, anhydrous milkfat, lard, beef fat, and the like, as well as mixtures thereof. Preferred edible low melting triglycerides should be stable against oxidation or hydrolysis and may include canola oil, palm oil, palm kernel oil, coconut oil, partially hydrogenated soybean oil, and mixtures thereof. Selection of low melting triglyceride blend meeting the SFC specifications of this invention helps to ensure superior barrier effectiveness, desirable mouthfeel characteristics and acceptable handling properties of the final barrier composition. For example, the SFC of the barrier composition of this invention is also design to be no more than about 35 percent at a temperature above 37 to about 50° C., preferably less than about 20 percent. In addition, the difference in SFC between about 20° C. and 37° C. of the barrier composition is set at least about 20 percent and preferably more than about 30 percent.

Flexible Hydrophobic Layer Composition

The multilayer edible moisture barrier further includes a flexible hydrophobic layer. The flexible hydrophobic layer may include waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof. The flexible hydrophobic layer is generally about 50 microns to about 1 mm thick, and preferably about 125 to about 300 microns thick.

Application of Multilayer Moisture Barrier

The lipid composition is first heated to about 40 to about 50° C. at which nearly all the fats from low melting triglyceride or blend are melted. The microparticulated, high melting lipid, if included in the lipid composition, is not physically altered or melted. Where inhibition of moisture migration between adjacent portions of a food product having different water activities is desired, the moisture barrier composition can be applied to the contacting surface of one (or both) portions and allowed to cool to below about 20° C., before the portions are brought together. The moisture barrier composition will have a viscosity of about 20 to about 2000 cps at a temperature of from about 40 to about 50° C. Where inhibition of moisture migration between a food product and the ambient environment is desired, the moisture barrier composition can be applied to one or more of the outer surfaces of the food product and allowed to cool. In an important aspect of the invention, desirable particle sizes can be obtained without controlled cooling rates due to the use of microparticulated high melting lipid. This is an unexpected advantage over the use of other types of fat crystal control agents such as high melting waxes and emulsifiers by first melting such fat crystal control agents in triglyceride blend. Conventional fat crystal control or seeding agents (e.g., sorbitan tristearate, polyglycerol esters such as di/triglycerol mono/di-oleate, and the like) may also be used in combination with faster cooler rates.

Suitable techniques for applying the barrier include, for example, spraying, dipping, pan coating, enrobing, deposition, extrusion, use of a fluidized bed, and the like. In one embodiment of the invention, the barrier is applied by immersing the food product, or simply the surface thereof to be coated, into a melted or molten moisture barrier composition, removing the food product, and allowing the coated product to cool. In another embodiment of the invention, the molten film is applied by brushing or otherwise applying the composition to the desired surface(s) of the product. In still another embodiment, the film can be applied using a spray, including atomized spray, air-brushing, and the like. Generally, the edible moisture barrier is applied to the food component to form an essentially continuous barrier layer at least about 20 microns thick, preferably about 100 microns to about 1 mm thick, and more preferably about 200 to about 500 microns thick.

The flexible hydrophobic layer is preferably applied over the lipid layer using similar techniques. Even more preferably, the flexible hydrophobic layer is applied at a temperature of about 45 to about 60° C. and spraying onto the lipid layer. Preferably, the low melting lipid layer is applied adjacent to the food having the higher water activity.

Optional Crystal Growth Modifiers

The lipid layer may also include, as an optional ingredient, a material which is effective for promoting the formation of small, fat crystals (from the triglyceride blend during cooling. Examples of such optional crystal growth modifiers include microparticulated high melting lipids, crystal growth inhibiting agents (e.g., polyglycerol esters, sorbitan tristearate), and the like as well as mixtures thereof. Microparticulated high melting lipids having a melting point of about 70° C. or higher are generally preferred for use as crystal growth modifiers in the present invention. Such crystal growth modifiers inhibit crystal growth and, thus, are effective for promoting the formation of small fat crystals (from the triglyceride blend during cooling). Such small fat crystals effectively immobilize remaining liquid oil fraction of the triglyceride blend, thus preventing liquid oil from draining from the fat crystal network. During subsequent storage, such fat crystal control agents are also effective in stabilizing the three dimensional solid fat crystal network made of numerous small fat crystals. The presence of smaller fat crystals generally provides a better moisture barrier.

If used, the microparticulated high-melting lipids are present in the lipid layer composition at a level of about 1 to about 35 percent, and preferably about 5 to about 15 percent. If used, crystal growth inhibiting agents are present in the lipid layer composition at a level of about 0.01 to about 1 percent, and preferably about 0.1 to about 0.3 percent.

Preferred edible high melting lipids have melting points of about 70° C. or higher, and more preferably about 100° C. or higher. For purposes of this invention, the term "edible high melting lipids" includes edible long chain fatty acids, their monoglycerides, diglycerides, and triglycerides, their alkaline metal salts, and other derivatives thereof. Other natural or synthetic, food-approved, high melting lipids or lipid-like substances such as fatty alcohol (wax), paraffin, and sucrose polyesters can also be used. Generally, the edible high melting lipids are formed from long chain fatty acids having at least about 12 carbon atoms and preferably about 18 to about 24 carbon atoms; preferably, the long chain fatty acids are saturated. Suitable saturated long chain fatty acids used to form the edible high melting lipids include, for example, palmitic, stearic acid, arachidic acid, behenic acid, lignoceric acid, and the like; their derivatives, including, for example, glyceryl monostearate, glycerol distearate, glycerol tristerate, calcium stearate, magnesium stearate, high melting sucrose polyesters, high melting fatty alcohols, high melting waxes, high melting phospholipids, and the like, as well as mixtures thereof.

Such high melting lipids are microparticulated using any conventional micromilling equipment. Suitable micromilling equipment includes, for example, ball mills, colloid mills, fluid energy mills, pin/disk mills, hammer mills, and the like. The edible high melting lipid is micromilled at a temperature of about 40 to about 70° C., preferably about 45 to about 60° C. The micromilling is effective for providing numerous fragments with a particle size of about 0.1 microns or less which are believed to be the functional component responsible for fat crystal control and stabilization. In such microparticulated high melting lipid, the volume average particle size as measured by a Horiba LA-900 laser particle sizer (Horiba Instrument, Inc. Irvine, Calif.) is about 10 microns or less, and preferably about 1 to about 5 microns, with at least about 5 percent of the particles (based on volume basis) being less than about 0.1 microns, and preferably with about 1 to about 20 percent being less than about 1 microns. Generally, the particle size is preferably measured at about 20° C. by dispersing microparticulated high melting lipid in soybean oil using a sonicator prior to measurement.

One preferred microparticulated high melting fat for use in the present invention is micromilled calcium stearate. Micromilled calcium stearate is stable, as it has a melting point of about 145° C., is water insoluble, is an approved GRAS food ingredient, and has a reasonable cost.

The following examples illustrate methods for carrying out the invention and should be understood to be illustrative of, but not limiting upon, the scope of the invention which is defined in the appended claims.

EXAMPLES

Example 1

A low melting lipid layer composition was formed by blending palm kernel oil (PKO) and canola oil (CO) at a PKO:CO ratio of about 72:28 at a temperature of 50° C. The solid fat content of the low melting lipid layer composition was as indicated in the following table:

| Temperature (°) | SFC (%) |
|---|---|
| 0 | 65.0 |
| 5 | 64.3 |
| 10 | 59.6 |

-continued

| Temperature (°) | SFC (%) |
|---|---|
| 20 | 38.9 |
| 25 | 16.5 |

A flexible hydrophobic layer composition was prepared by blending an acetylated monoglyceride (Myvacet 7-07K from Quest International; melting point of about 40° C.) and anhydrous milkfat in a ratio of about 54:46 at about 80° C.

Cheese slices (Kraft Cheddar Singles prepared using 2% milk) were coated on both sides with either the low melting lipid layer composition (Control 1) or the flexible hydrophobic layer (Control 2). Application was carried out by spraying each side of the cheese slice twice at a rate of about 2 g/side (providing a total of 4 g/side; the first application was allowed to solidify before the topcoat was applied) using a Dot Gun Sprayer (CE00/C-1100; hhs Leimauftrags-Systeme GmbH, Krefeld, Germany) operated at about 50° C. The thickness of barrier material was about 250 microns for each side.

Inventive samples were prepared by first spray coating each side of the cheese slices with about 2 g/side of the low melting lipid layer composition using the same technique and conditions as described above, allowing the low melting lipid layer to solidify, and then spray coating each low melting lipid layer with about 2 g/side of the flexible hydrophobic layer composition using the same technique and conditions as described above. The thickness of the low melting lipid layer was about 125 microns and the thickness of the flexible hydrophobic layer was about 125 microns, for a total thickness of abut 250 microns on each side.

Half of the samples for each coating composition (i.e., Controls 1 and 2 and Inventive Sample) were severely cracked through controlled deformation (i.e., bending until the layers visually cracked). Then each individual sample was weighed and then placed on a perforated metal tray which was stored in a refrigerated 0.33 $A_w$ desiccator. Individual samples were weighed after 1, 2, and 4 weeks storage time.

The results are presented in Table 1 below. As can be seen from this data, the inventive samples preformed significantly better than either control. Indeed, even the "cracked" inventive sample preformed significantly better than the continuous or "uncracked" control samples. Comparing the "cracked" inventive samples with the "cracked" control samples shows dramatic improvement for the inventive samples. Thus, even if the integrity of inventive sample is breached, which is less likely to happen because of its flexible nature, it would still be expected to preform at high levels to maintain moisture levels in food products having components with different water activities.

| | Average Moisture Loss (%) | | | | | |
|---|---|---|---|---|---|---|
| | Control 1 | | Control 2 | | Inventive Sample | |
| Time (days) | Continuous | Cracked | Continuous | Cracked | Continuous | Cracked |
| 0 | 0 | 0 | 0 | 0 | 0 | 0 |
| 6 | 0.30 ± 0.28 | 1.18 ± 0.16 | 0.11 ± 0.04 | 0.17 ± 0.07 | −0.06 ± 0.004 | 0.05 ± 0.07 |

-continued

| | Average Moisture Loss (%) | | | | | |
|---|---|---|---|---|---|---|
| | Control 1 | | Control 2 | | Inventive Sample | |
| Time (days) | Continuous | Cracked | Continuous | Cracked | Continuous | Cracked |
| 14 | 0.75 ± 0.54 | 2.36 ± 0.13 | 0.34 ± 0.10 | 0.43 ± 0.16 | −0.01 ± 0.07 | 0.19 ± 0.15 |
| 21 | 0.92 ± 0.72 | 3.05 ± 0.11 | 0.41 ± 0.09 | 0.58 ± 0.20 | 0.03 ± 0.07 | 0.25 ± 0.22 |
| 38 | 1.32 ± 1.05 | 4.25 ± 0.21 | 0.70 ± 0.16 | 0.87 ± 0.28 | 0.04 ± 0.03 | 0.34 ± 0.26 |

Example 2

An inventive multilayer moisture barrier (using the compositions of Example 1) was applied to a deli sliced process cheese food as described Example 1. The cheese slices with the inventive moisture barrier were placed between two slices of white toast. The resulting cold cheese sandwich was then evaluated using an informal sensory panel. The inventive moisture barrier was not waxy or gritty and did not exhibit any off-flavors or other organoleptic properties.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A multilayer edible moisture barrier suitable to separate food components having different water activities in a food product, said moisture barrier comprising:
   at least one lipid layer which comprises from about 65 to about 99 weight percent of an edible low melting triglyceride blend having a melting point of 35° C. or lower, and from about 1 to about 35 weight percent of edible microparticulated high melting lipid particles having a melting point of 70° C. or higher and a volume average particle size of less than about 10 microns, at least about 5 percent of the microparticulated high melting lipid particles having a particle size of not more than 0.1 micron, the lipid layer having a solid fat content of from about 50 to about 70 percent at a refrigerated storage temperature of 0° C. to 10° C. and at an ambient storage temperature of 15° C. to 25° C., the solid fat content of the lipid layer not changing more than about 5% at a refrigerated storage temperature of 0°–10° C. or at an ambient storage temperature of 15° C. to 25° C., the lipid layer having sufficient microparticulated high melting lipid particles with a particle size of not more than 0.1 micron effective to prevent liquid oil in the lipid layer from draining from a fat crystal network formed in the lipid layer; and
   at least one flexible hydrophobic barrier layer.

2. The moisture barrier of claim 1, wherein the lipid layer has a solid fat content of from about 50 to about 70 percent.

3. The moisture barrier of claim 2, wherein the lipid layer has a solid fat content of from about 55 to about 70 percent.

4. The moisture barrier of claim 3, wherein the lipid layer has a solid fat content of from about 60 to about 65 percent.

5. The moisture barrier of claim 1, wherein the lipid layer has a solid fat content of less than about 35 percent above 37° C.

6. The moisture barrier of claim 1, wherein the edible microparticulated high melting lipid is selected from the group consisting of stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, high melting phospholipids, and mixtures thereof.

7. The moisture barrier of claim 6, wherein the edible low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride, and mixtures thereof.

8. The moisture barrier of claim 7, wherein the flexible hydrophobic layer is selected from the group consisting of waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof.

9. The moisture barrier of claim 8, wherein the at least one lipid layer contains about 5 to about 25 percent of the edible microparticulated high melting lipid and wherein the edible microparticulated high melting lipid has a melting point of 100° C. or higher and a volume average particle size of less than about 5 microns.

10. The multilayer edible moisture barrier of claim 9, wherein the flexible hydrophobic layer is about 50 microns to about 1 mm thick.

11. The moisture barrier of claim 1, wherein the edible microparticulated high melting lipid is calcium stearate.

12. The moisture barrier of claim 1, wherein the edible low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride, and mixtures thereof.

13. The moisture barrier of claim 1, wherein the at least one lipid layer contains about 5 to about 25 percent of the edible microparticulated high melting lipid and wherein the edible microparticulated high melting lipid has a melting point of 100° C. or higher and a volume average particle size of less than about 5 microns.

14. The moisture barrier of claim 13, wherein the at least one lipid layer comprises about 5 to about 15 percent of the edible microparticulated high melting lipid.

15. The moisture barrier of claim 1, wherein the lipid layer is about 50 microns to about 1 mm thick.

16. The moisture barrier of claim 1, wherein the lipid layer further comprises a dispersion of solid particles, the solid particles selected from the group consisting of solid particles of chocolate, peanut butter, confectionery cream, and mixtures thereof.

17. The moisture barrier of claim 1, wherein the flexible hydrophobic layer is selected from the group consisting of waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof.

18. The multilayer edible moisture barrier of claim 17, wherein the flexible hydrophobic layer is about 50 microns to about 1 mm thick.

19. A method for reducing moisture migration between food components having different water activities in a food product, said method comprising applying an edible multilayer moisture barrier between the food components; and
applying at least one flexible hydrophobic layer thereto, wherein the edible multilayer moisture barrier comprises at least one lipid layer comprising from about 65 to about 99 weight percent of an edible low melting triglyceride blend having a melting point of 35° C. or lower,
from about 1 to about 35 weight percent of edible microparticulated high melting lipid particles having a melting point of 70° C. or higher, and
the microparticulated high melting lipid particles in the lipid layer having a volume average particle size of less than about 10 microns, at least about 5 percent of the microparticulated high melting lipid particles having a particle size of not more than 0.1 micron, the lipid layer having a solid fat content of from about 50 to about 70 percent at a refrigerated storage temperature of 0° C. to 5° C. and at an ambient storage temperature of 15° C. to 25° C., the solid fat content of the lipid layer not changing more than about 5% at a refrigerated storage temperature of 0° C. to 10° C. or at an ambient storage temperature of 15° C. to 25° C., the lipid layer having sufficient microparticulated high melting lipid particles with a particle size of not more than 0.1 micron effective to prevent liquid oil in the lipid layer from draining from a fat crystal network formed in the lipid layer.

20. The method of claim 19, wherein the at least one lipid layer has a solids fat content of from about 50 to about 70 percent.

21. The method of claim 20, wherein the at least one lipid layer has a solids fat content of from about 60 to about 65 percent.

22. The method of claim 19, wherein the lipid layer has a solids fat content of less than about 35 percent above 37° C.

23. The method of claim 19, wherein the edible microparticulated high melting lipid is selected from the group consisting of stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, high melting phospholipids, and mixtures thereof.

24. The method of claim 23, wherein the edible microparticulated high melting lipid is calcium stearate.

25. The method of claim 23, wherein the edible low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride, and mixtures thereof.

26. The method of claim 25, wherein the flexible hydrophobic layer is selected from the group consisting of waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof.

27. The method of claim 26, wherein the flexible hydrophobic layer is about 50 microns to about 1 mm thick.

28. The method of claim 26 wherein the flexible hydrophobic layer is applied onto the lipid layer.

29. The method of claim 19, wherein the edible low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride, and mixtures thereof.

30. The method of claim 19, wherein the at least one lipid layer contains about 5 to about 25 percent of the edible microparticulated high melting lipid and wherein the melting point of the edible microparticulated high melting lipid is about 100° C. or higher and the volume average particle size of the edible microparticulated high melting lipid is about 5 microns or less.

31. The method of claim 19, wherein the lipid layer is about 50 microns to about 1 mm thick.

32. The method of claim 19, wherein the lipid layer further comprises a dispersion of solid particles, the solid particles selected from the group consisting of solid particles of chocolate, peanut butter, confectionery cream and mixtures thereof.

33. The method of claim 19, wherein the flexible hydrophobic layer is selected from the group consisting of waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof.

34. The method of claim 33, wherein the flexible hydrophobic layer is about 50 microns to about 1 mm thick.

35. The method of claim 19 wherein the flexible hydrophobic layer is applied onto the lipid layer.

36. A multilayer edible moisture barrier suitable to separate food components having different water activities in a food product, said moisture barrier comprising:
at least one lipid layer which comprises from about 65 to about 99 weight percent of an edible low melting triglyceride blend having a melting point of 35° C. or lower, and from about 1 to about 35 weight percent of edible microparticulated high melting lipid particles having a melting point of 70° C. or higher and a volume average particle size of less than about 10 microns at least about 5 percent of the microparticulated high melting lipid particles having a particle size of not more than 0.1 micron, the lipid layer having a solid fat content of from about 50 to about 70 percent at a refrigerated storage temperature of C-10 C, the solid fat content of the lipid layer not changing more than about 5% at a refrigerated storage temperature of 0°–10° C., the lipid layer having sufficient microparticulated high melting lipid particles with a particle size of not more than 0.1 micron effective to prevent liquid oil in the lipid layer from draining from a fat crystal network formed in the lipid layer; and
at least one flexible hydrophobic barrier layer.

37. The multilayer edible moisture barrier of claim 36, wherein from 1 to about 20 of the microparticulated particles of the high melting lipid have a particle size of less than 1 micron and a volume average particle size of less than about 5 microns.

38. The moisture barrier of claim 37, wherein the lipid layer has a solid fat content of from about 60 to about 65 percent.

39. The moisture barrier of claim 38, wherein the lipid layer has a solid fat content of less than about 35 percent above 37° C.

40. The moisture barrier of claim 37, wherein the edible microparticulated high melting lipid is selected from the group consisting of stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, high melting phospholipids, and mixtures thereof.

41. The moisture barrier of claim 40, wherein the edible low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride, and mixtures thereof.

42. The moisture barrier of claim 41, wherein the at least one lipid layer contains about 5 to about 25 percent of the edible microparticulated high melting lipid and wherein the edible microparticulated high melting lipid has a melting point of 100° C. or higher.

43. The moisture barrier of claim 41, wherein the flexible hydrophobic layer is selected from the group consisting of waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof.

44. The moisture barrier of claim 37, wherein the edible microparticulated high melting lipid is calcium stearate.

45. The moisture barrier of claim 37, wherein the flexible hydrophobic layer is selected from the group consisting of waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof.

46. A method for reducing moisture migration between food components having different water activities in a food product, said method comprising applying an edible multilayer moisture barrier between the food components; and
applying at least one flexible hydrophobic layer thereto, wherein the edible multilayer moisture barrier comprises at least one lipid layer comprising from about 65 to about 99 weight percent of an edible low melting triglyceride blend having a melting point of 35° C. or lower, and
from about 1 to about 35 weight percent of an edible microparticulated high melting lipid particles having a melting point of 70° C. or higher, the microparticulated high melting lipid particles in the lipid layer having a volume average particle size of less than about 10 micron, at least about 5 percent of the lipid particles having a particle size of not more than 0.1 micron, the lipid layer having a solid fat content of from about 50 to about 70 percent at a refrigerated storage temperature of 0 C–10 C, the solid fat content of the lipid layer not changing more than about 5% at a refrigerated storage temperature of 0°–10C., the lipid layer having sufficient microparticulated high melting lipid particles with a particle size of not more than 0.1 micron effective to prevent liquid oil in the lipid layer from draining from a fat crystal network formed in the lipid layer.

47. The method of claim 46, wherein from 1 to about 20 of the microparticulated particles of the high melting lipid have a particle size of less than 1 micron and a volume average particle size of less than 5 microns.

48. The method of claim 47, wherein the lipid layer has a solid fat content of from about 60 to about 65 percent.

49. The method of claim 48, wherein the lipid layer has a solid fat content of less than about 35 percent above 37° C.

50. The method of claim 47, wherein the edible microparticulated high melting lipid is selected from the group consisting of stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, high melting phospholipids, and mixtures thereof.

51. The moisture barrier of claim 50, wherein the edible low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride, and mixtures thereof.

52. The method of claim 51, wherein the at least one lipid layer contains about 5 to about 25 percent of the edible microparticulated high melting lipid and wherein the edible microparticulated high melting lipid has a melting point of 100° C. or higher.

53. The method of claim 52, wherein the flexible hydrophobic layer is selected from the group consisting of waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof.

54. The method of claim 53 wherein the flexible hydrophobic layer is applied onto the lipid layer.

55. The method of claim 47, wherein the edible microparticulated high melting lipid is calcium stearate.

56. The method of claim 47, wherein the flexible hydrophobic layer is selected from the group consisting of waxes, acetic acid esters of monoglycerides, succinic acids of monoglycerides, citric acid esters of monoglycerides, propylene glycol monoesters, triglycerides containing at least one $C_2$ to $C_4$ fatty acid and at least one $C_{12}$ to $C_{24}$ fatty acid, alpha crystal forming lipids, and mixtures thereof.

57. The method of claim 46 wherein the flexible hydrophobic layer is applied onto the lipid layer.

58. An edible moisture barrier suitable to separate food components having different water activities in a food product, said moisture barrier comprising:
at least one lipid layer which comprises from about 65 to about 99 weight percent of an edible low melting triglyceride blend having a melting point of 35 C or lower, and from about 1 to about 35 weight percent of edible microparticulated high melting lipid particle having a melting point of 70° C. or higher and a volume average particle size of less than about 10 microns, at least about 5 percent of the microparticulated high melting lipid particles having a particle size of not more than 0.1 micron, the lipid layer having a solid fat content of from about 50 to about 70 percent at a refrigerated storage temperature of 0° C. to 10° C. and at an ambient storage temperature of 15° C. to 25° C., the solid fat content of the lipid layer not changing more than about 5% at a refrigerated storage temperature of 0°–10° C. or at an ambient storage temperature of 15° C. to 25° C., the lipid layer having sufficient microparticulated high melting lipid particles with a particle size of not more than 0.1 micron effective to prevent liquid oil in the lipid layer from draining from a fat crystal network formed in the lipid layer.

59. The moisture barrier of claim 58, wherein the lipid layer has a solid fat content of from about 50 to about 70 percent.

60. The moisture barrier of claim 59, wherein the lipid layer has a solid fat content of from about 55 to about 70 percent.

61. The moisture barrier of claim 60, wherein the lipid layer has a solid fat content of from about 60 to about 65 percent.

62. The moisture barrier of claim 58, wherein the lipid layer has a solid fat content of less than about 35 percent above 37° C.

63. The moisture barrier of claim 58, wherein the edible microparticulated high melting lipid is selected from the group consisting of stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, high melting phospholipids, and mixtures thereof.

64. The moisture barrier of claim 58, wherein the edible microparticulated high melting lipid is calcium stearate.

65. The moisture barrier of claim 58, wherein the edible low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride, and mixtures thereof.

66. The moisture barrier of claim 58, wherein the at least one lipid layer contains about 5 to about 25 percent of the edible microparticulated high melting lipid and wherein the edible microparticulated high melting lipid has a melting point of 100° C. or higher and a volume average particle size of less than about 5 microns.

67. The moisture barrier of claim 66, wherein the at least one lipid layer comprises about 5 to about 15 percent of the edible microparticulated high melting lipid.

* * * * *

UNITED STATES PATENT AND TRADEMARK OFFICE
CERTIFICATE OF CORRECTION

PATENT NO. : 7,229,654 B2 Page 1 of 1
APPLICATION NO. : 10/826709
DATED : June 12, 2007
INVENTOR(S) : Gaonkar et al.

It is certified that error appears in the above-identified patent and that said Letters Patent is hereby corrected as shown below:

In column 13, line 42, claim 20, delete "solids" and insert -- solid --.

In column 13, line 45, claim 21, delete "solids" and insert -- solid --.

In column 13, line 48, claim 22, delete "solids" and insert -- solid --.

In column 13, line 64, claim 25, after "milkfat" delete "at".

In column 14, line 47 (approx.), claim 36, delete "99" and insert -- 95 --.

In column 14, line 52 (approx.), claim 36, after "microns" insert -- , --.

In column 14, line 57 (approx.), claim 36, delete "C-10 C" and insert -- 0° C.-10°C. --.

In column 15, line 65, claim 46, delete "0 C-10 C" and insert -- 0° C.-10° C. --.

In column 15, line 67, claim 46, delete "0°-10C.," and insert -- 0°-10° C., --.

Signed and Sealed this

Seventh Day of August, 2007

JON W. DUDAS
*Director of the United States Patent and Trademark Office*